United States Patent
Yi et al.

(10) Patent No.: US 11,403,371 B2
(45) Date of Patent: Aug. 2, 2022

(54) DEVICE AND METHOD FOR BYPASSING ANALYSIS EVASION TECHNIQUE, AND RECORDING MEDIUM FOR A PROGRAM FOR PERFORMING THE SAME

(71) Applicant: Foundation of Soongsil University-Industry Cooperation, Seoul (KR)

(72) Inventors: Jeong Hyun Yi, Seongnam-si (KR); Sunjun Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 16/996,279

(22) Filed: Aug. 18, 2020

(65) Prior Publication Data
US 2021/0056182 A1    Feb. 25, 2021

(30) Foreign Application Priority Data

Aug. 21, 2019 (KR) .......... 10-2019-0102171
Jan. 7, 2020  (KR) .......... 10-2020-0001969

(51) Int. Cl.
*G06F 21/12* (2013.01)
*G06F 21/14* (2013.01)
*G06F 21/75* (2013.01)

(52) U.S. Cl.
CPC ........... *G06F 21/125* (2013.01); *G06F 21/14* (2013.01); *G06F 21/75* (2013.01)

(58) Field of Classification Search
CPC ......... G06F 21/125; G06F 21/14; G06F 21/75
USPC .......................................... 726/26
See application file for complete search history.

(56) References Cited

U.S. PATENT DOCUMENTS

| | | | | |
|---|---|---|---|---|
| 2014/0325664 | A1* | 10/2014 | Nekhoroshev | G06F 21/6209 726/26 |
| 2015/0154407 | A1* | 6/2015 | Yi | G06F 21/602 713/194 |
| 2018/0307837 | A1* | 10/2018 | Ahn | G06F 21/563 |

FOREIGN PATENT DOCUMENTS

| | | |
|---|---|---|
| JP | 2017-538217 A | 12/2017 |
| JP | 6666475 B2 | 3/2020 |
| KR | 10-2015-0047940 A | 5/2015 |
| KR | 10-1545272 B1 | 8/2015 |
| KR | 10-2017-0124752 A | 11/2017 |
| KR | 10-1803890 B1 | 12/2017 |
| KR | 10-2018-0127612 A | 11/2018 |
| KR | 10-1920597 B1 | 11/2018 |

* cited by examiner

*Primary Examiner* — Michael S McNally
(74) *Attorney, Agent, or Firm* — Novick, Kim & Lee, PLLC; Sang Ho Lee; Hyun Woo Shin

(57) ABSTRACT

Provided is a method for bypassing an analysis evasion technique, which includes: loading a dummy DEX file; parsing a dummy method containing a dummy code from the dummy DEX file; a bypass point identifying step of determining whether a function to be currently called is a bypass target function to which the analysis evasion technique is applied; a branch target point changing step of changing information according to the determination result so that the dummy code is executed instead of the call target function; and a dummy code executing step of transmitting the dummy code to a framework of the application, so that a modulated framework is executed with a bypass code.

12 Claims, 3 Drawing Sheets

DEVICE AND METHOD FOR BYPASSING ANALYSIS EVASION TECHNIQUE, AND RECORDING MEDIUM FOR A PROGRAM FOR PERFORMING THE SAME

TECHNICAL FIELD

This disclosure relates to a technology for bypassing an analysis evasion technique, and more specifically, to a device and method for analyzing an analysis evasion technique applied to an application using a hooking-based bytecode anti-reversing automatic bypassing technology and then bypassing the analyzed analysis evasion technique, and a recording medium in which a program for performing the method is recorded.

BACKGROUND ART

The types and number of Android applications are rapidly increasing due to the excellent scalability of Android. Accordingly, the number of cases in which user's personal information is requested in a mobile environment has increased, and the importance of security in the mobile environment is also increasing day by day.

In this regard, as the Android application market expands, the types and number of malicious applications that threaten the security of users are increasing day by day, and the level of analysis evasion techniques that evade an analysis system for detecting the malicious applications is also increasing. For this reason, a way for bypassing the analysis evasion technique is required.

Meanwhile, the existing methods for bypassing the analysis evasion technique mostly bypass the analysis evasion technique in a PC environment. In addition, the analysis evasion techniques in a mobile environment representatively use rooting detection, emulator detection, debugger detection, or the like, and it is known in the art that the analysis evasion technique does not normally analyze applications in the rooting environment, the emulator environment and the debugger operating environment.

Accordingly, there is a demand to provide a scheme for preventing the analysis evasion technique in a mobile environment from detecting the corresponding environment, or for performing the same operation as when the analysis evasion technique does not detect the environment even though the analysis evasion technique detects the corresponding environment.

In the existing technology for bypassing an analysis evasion technique, the analysis evasion technique is detected by observing an operation of the application in command units, and then the analysis evasion technique is bypassed.

Therefore, if the existing technology for bypassing an analysis evasion technique is used, malicious applications would not be analyzed effectively, and thus the analysis evasion technique would be bypassed slowly.

DISCLOSURE

Technical Problem

The present disclosure is directed to providing a device and method, which may analyze an analysis evasion technique in a mobile environment and a PC environment and execute a dummy code instead of a call target function, and a recording medium that records a program to perform the method.

Technical Solution

In an aspect of the present disclosure, there is provided a method for bypassing an analysis evasion technique applied to an application using an analysis evasion device for analyzing and bypassing the analysis evasion technique applied to an application, the method including: loading a dummy DEX file stored in a storage unit; parsing a dummy method containing a dummy code from the dummy DEX file; identifying a bypass point by comparing a set modulation point with a database command code, and based on a comparison result, determining whether a function to be currently called is a bypass target function to which the analysis evasion technique is applied; changing a branch target point by changing information according to a determination result so that the dummy code is executed instead of the bypass target function; and executing the dummy code by transmitting the dummy code to a framework of the application and executing the dummy code.

In addition, the identifying the bypass point may determine that the analysis evasion technique is applied to the application when the set modulation point is identical to the database command code stored in a database.

In addition, the dummy method may include at least one of class, field, and method.

In addition, the set modulation point may be a point at which the analysis evasion technique is applied in the application.

In addition, the dummy code may be parsed in a preprocessing process before the application is executed.

In addition, the analysis evasion technique may be bypassed by executing the dummy code.

In another aspect of the present disclosure, there is also provided a non-transitory computer-readable recording medium in which a computer program for the method of bypassing an analysis evasion technique described above is recorded.

In another aspect of the present disclosure, there is also provided a device for bypassing an analysis evasion technique, the device including: a dummy DEX loader configured to load a dummy DEX file containing a dummy code in a memory before an application is executed; a dummy method parser configured to parse a dummy method containing the dummy code from the dummy DEX file; a code modulator configured to modulate a code and an environment value of a framework execution environment when a method of the analysis evasion technique is executed, so that the method is not executed and the dummy code is executed; and a callback unit configured to detect a signal generated when a new method is called from a framework of the application and transmit a completion signal to the framework to perform a normal operation when the bypassing work is completed by executing the dummy code.

In addition, the dummy method may include at least one of class, field, and method.

In addition, the framework may be an Android framework.

In addition, the environment value may be modulated when a set modulation point is determined as being identical to a database command code stored in a database.

In addition, the set modulation point may be a point at which the analysis evasion technique is applied in the application.

Advantageous Effects

Since the device and method for bypassing an analysis evasion technique and a recording medium recording a program for performing the method according to the present disclosure are provided, the analysis evasion technique may be analyzed in the mobile environment and quickly bypassed.

BEST MODE

Figure 1:
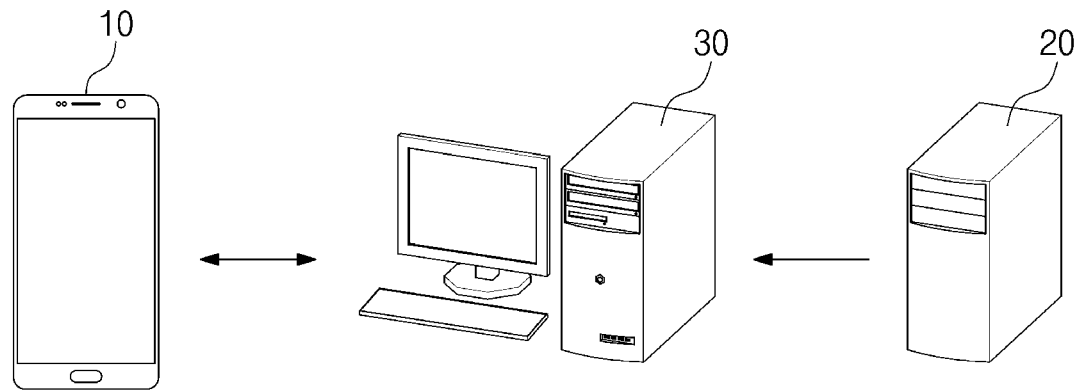
FIG. 1 is a schematic diagram showing a system including an analysis evasion technique bypass device according to an embodiment of the present disclosure.

The following detailed description of the present disclosure refers to the accompanying drawings that exemplarily illustrate specific embodiments in which the present disclosure may be implemented. These embodiments are described in sufficient detail to enable a person skilled in the art to practice the present disclosure. It should be understood that various embodiments of the present disclosure are different but need not be exclusive from each other. For example, specific shapes, structures, and characteristics described herein may be implemented in other embodiments without departing from the idea and scope of the present disclosure in relation to one embodiment. In addition, it should be understood that locations or arrangement of individual components in each disclosed embodiment may be changed without departing from the idea and scope of the present disclosure. Accordingly, the following description is not intended to limit the scope, and the scope of the present disclosure, if properly described, is limited only by the appended claims, along with all scopes equivalent to the features defined in the claims. Like reference numerals in the drawings indicate the same or similar functions over several aspects.

Hereinafter, preferred embodiments of the present disclosure will be described in more detail with reference to the drawings.

FIG. 1 is a schematic diagram showing a system including an analysis evasion technique bypass device according to an embodiment of the present disclosure.

A system 1 including an analysis evasion technique bypass device may include a mobile device 10, a database device 20, and an analysis evasion technique bypass device 30.

The mobile device 10 may be a device provided to execute an Android-based application. Here, the application may be developed to achieve the purpose of each application by executing a command code created by an application developer.

In addition, the application command code is information that has undergone a decompiling process of a machine language of the application and may include information that may be easily analyzed due to high readability. Accordingly, the application command code may include information of a code written to perform the purpose of the application, such as a class, a field, and a method.

The database device 20 may be a device having a database in which a database command code for determining an analysis evasion technique applied to an application and bypassing the analysis evasion technique is stored for each type of analysis evasion technique.

Here, the database command code may include data for easily analyzing the application command code through a decompiling process of the machine language of the application. Accordingly, the database command code may include information of a code written to modulate the application command code to bypass an analysis evasion technique such as solution, Class, Method, Line, Smali, Param1 and Param2.

Table 1 below shows a list of dummy methods used in the present disclosure. The dummy method used in the present disclosure may be largely classified into two types. The first type is 'void_dummy_func', which stops without performing any action, and the second type is other functions besides 'void_dummy_func', which return to a value of an input primitive type (basic data type such as int and char). Most dummy methods may be solved through 'void_dummy_func' to make the same result as if it was not executed, but some methods may cause the application to terminate abnormally by directly affecting the execution storing when the returned value is stored and used. For this reason, the present disclosure is used to solve the corresponding problem.

TABLE 1

| | |
|---|---|
| boolean boolean_dummy_func(boolean) | Input boolean variable returned as it is. |
| byte byte_dummy_func(byte) | Input byte variable is returned as it is. |
| char char_dummy_func(char) | Input char variable is returned as it is. |
| double double_dummy_func(double) | Input double variable is returned as it is. |
| float float_dummy_func(float) | Input float variable is returned as it is. |
| int int_dummy_func(int) | Input int variable returned as it is. |
| long long_dummy_func(long) | Input long variable returned as it is. |
| short short_dummy_func(short) | Input short variable is returned as it is. |
| void void_dummy_func(void) | Void is returned without performing any action. |

Table 2 below shows an example of the database command code. This example is just for helping understanding of the present disclosure, and the present disclosure is not limited to this example.

TABLE 2

| | |
|---|---|
| Solution | Rootkit_v1.4 |
| Class | com/Rootkit/checker |
| Method | boolean isRoot(int) |
| Line | 17 |
| Small | return vAA |
| Param1 | 0 |
| Param2 | void |

Here, Solution may be a name selected, so that type, method, and version of the analysis evasion technique to be bypassed may be concisely identified. For example, Solution may include a solution named Rootkit_v1.4, and the corresponding Solution may be information indicating 1.4 version of the solution of the analysis evasion technique written with a rooting detection technique.

Here, Class can mean structural characteristics of the application command code, and may be understood as representing an analysis evasion technique among a plurality of command codes created to perform the purpose of the application, or meaning structural characteristics of a command code used in the analysis evasion technique.

Also, Method may be understood as a set of commands including a command for performing a specific operation. For example, Method may be written in the form of Boolean isRoot(int) to include a command for detecting whether the application is executed in a rooting environment.

In addition, Line may be information indicating the number of lines of code that executes the command indicated by Method.

Also, Smali may be expressed in an intermediate programming language that is more readable than the machine language of the application, and Smali is an auxiliary data used when additional analysis of the application is required.

In addition, Param1 and Param2 are data values used in the corresponding command, and data values obtained by modulating Param1 and Param2 are stored in a database. In the present disclosure, bypass is possible by using only three data stored in the database, namely Solution name, Class name and Method name.

The analysis evasion technique bypass device 30 may compare a set modulation point with the database command code stored in the database device 20 and determine based on the comparison result whether the analysis evasion technique is applied to the application command code. Here, the modulation point means a point at which the analysis evasion technique is applied in the application.

For this, the analysis evasion technique bypass device 30 may receive a database storing the database command code from the database device 20.

If the analysis evasion technique is applied to the application command code, the analysis evasion technique bypass device 30 changes the information to execute a dummy code loaded in a preprocessing process instead of the stored call target function, so that bypassing work may be performed.

Here, in order to verify whether the dummy code needs to be executed to bypass the analysis evasion technique, the analysis evasion technique bypass device 30 may compare the set modulation point with the database command code stored in the database device 20 as above. Then, if the set modulation point is identical to the database command code according to the comparison result, the analysis evasion technique bypass device 30 may determine that the dummy code needs to be executed. Also, if the set modulation point is different from the database command code according to the comparison result, the analysis evasion technique bypass device 30 may determine that it is not needed to execute the dummy code.

Here, the framework may be understood as the environment in which the application is executed. The framework may be an Android-based framework.

Meanwhile, the database device 20 and the analysis evasion technique bypass device 30 may be integrated into one device to perform complex functions.

Figure 2:
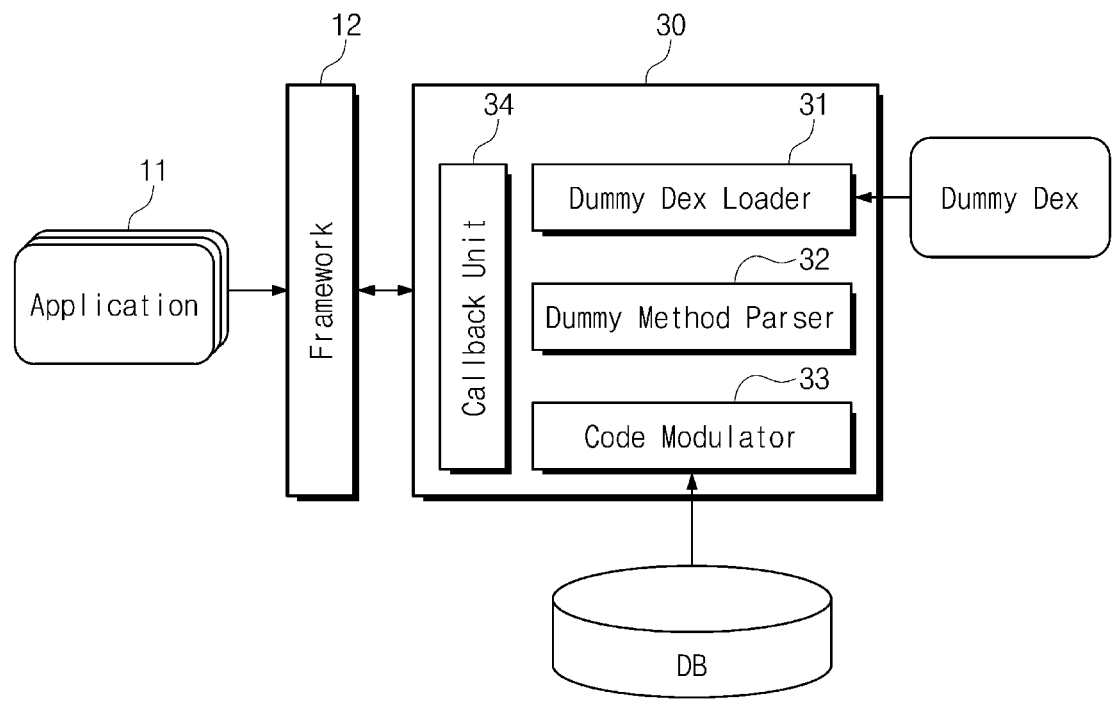
FIG. 2 is a block diagram showing the analysis evasion technique bypass device according to an embodiment of the present disclosure.

FIG. 2 is a block diagram showing the analysis evasion technique bypass device according to an embodiment of the present disclosure.

The analysis evasion technique bypass device 30 may include a dummy DEX loader 31, a dummy method parser 32, a code modulator 33, and a callback unit 34. In FIG. 2, the database (DB) may be understood as the database device 20 of FIG. 1, and the database (DB) may be included in the analysis evasion technique bypass device 30.

The dummy DEX loader 31 loads a dummy DEX file containing a dummy code into a memory of a mobile phone in advance before an application 11 is executed.

The dummy method parser 32 manages dummy methods composed of dummy codes by parsing from the dummy DEX file loaded as described above.

The code modulator 33 modulates a code and an environment value of the Android execution environment when the method of the analysis evasion technique is executed so that the dummy code is not executed without executing the corresponding method. Here, the operation of modulating the code and the environment value of the Android execution environment follows the verification method. In other words, if the modulation point set in the analysis evasion technique bypass device 30 is identical to the database command code stored in the database device 20 according to comparison, the code and the environment value of the Android execution environment are modulated so that the dummy code is executed. As a result, the method is not executed, which is substantially the same as the analysis evasion technique is bypassed. If the modulation point is different from the database command code, the code and the environment value of the Android execution environment are not modulated.

The case where the code and the environment value of the Android execution environment are not modulated corresponds to a case where it is not necessary to bypass the analysis evasion technique at the modulation point. In this case, the corresponding modulation point may be transmitted to a framework 12 of the application 11, and accordingly the application may be executed according to the framework including the unmodulated modulation point.

The callback unit 34 detects a signal generated when a new method is called from the framework 12. In addition, after the bypassing work by the execution of the dummy code is completed, a signal is transmitted to the framework 12 to perform a normal operation again.

Figure 3:
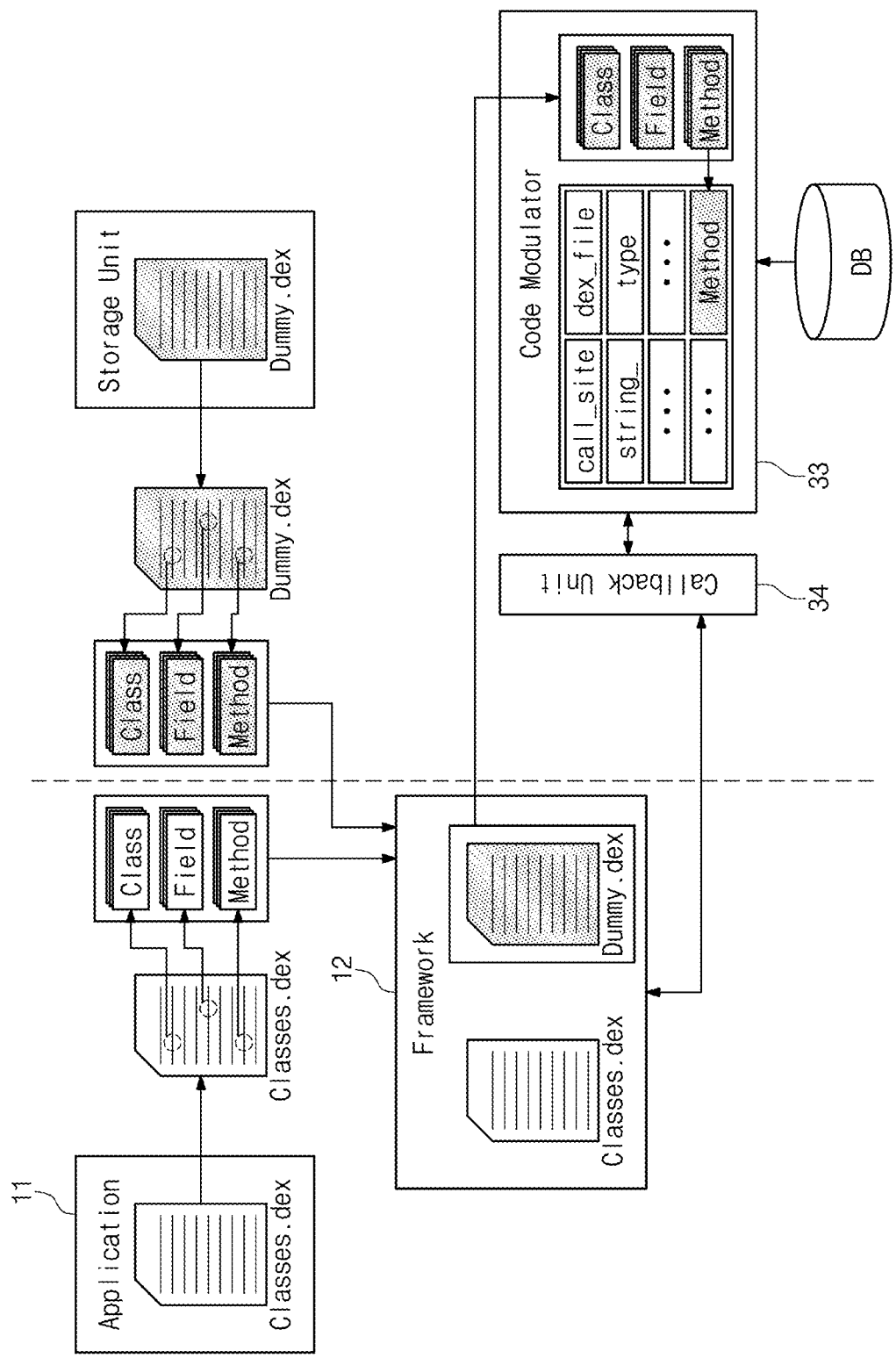
FIG. 3 is a schematic diagram showing a structure of the analysis evasion technique bypass device according to an embodiment of the present disclosure.

FIG. 3 is a schematic diagram showing a structure of the analysis evasion technique bypass device according to an embodiment of the present disclosure. Here, based on a dotted line in the center, a left part represents a structure for normal application operation, and a right part is a structure that executes the dummy code to bypass the analysis evasion technique according to the present disclosure.

A normal application operation and a dummy code execution operation according to the present disclosure will be described as follows with reference to FIGS. 2 and 3.

First, the normal application operation is as follows.

An application 11 to be executed is loaded.

Subsequently, a classes.dex file existing in the application 11 is loaded, and the loaded classes.dex file is parsed so as to be managed on the framework 12.

After that, the framework 12 manages the DEX file loaded as above and information such as class, field, method, or the like extracted from the DEX file by parsing. In addition, the framework 12 operates the application 11 normally by using the information.

The operation for executing the dummy code to bypass the analysis evasion technique is as follows.

First, a dummy DEX file stored in the storage unit (for example, the memory) is loaded. The dummy DEX file includes dummy codes for bypassing the analysis evasion technique.

Similar to the normal application operation in which the classes.dex file in the application 11 is loaded and parsed, in order to execute the dummy code of the dummy DEX file loaded from the storage unit, class, field and method information are parsed from the dummy DEX file so as to be managed in the framework 12. If the dummy DEX file is completely parsed, all preprocessing processes to be performed before the application 11 is executed are completed.

A signal generated whenever the framework 12 calls a new function is detected, and the dummy code is executed to perform the bypassing work from the point when the signal is generated. This operation is called method call signal handling.

Based on the comparison result between the modulation point set as described above and the database command code stored in the database (DB), it is identified whether a function to be currently called is a bypass target function to which the analysis evasion technique is applied.

According to the comparison result, if the set modulation point and the database command code stored in the database (DB) are the same, the function to be currently called may be identified as the bypass target function to which the analysis evasion technique is applied. If the set modulation point and the database command code are different, it may be identified that the function to be currently called is not the bypass target function to which the analysis evasion technique is applied.

If it is identified that the function to be currently called is not the bypass target function to which the analysis evasion technique is applied, this corresponds to a case where it is not required to bypass the analysis evasion technique at the modulation point. In this case, the corresponding modulation point may be transmitted to the framework 12 of the application 11, and accordingly the application may be executed according to the framework including the unmodulated modulation point.

An Android code calling structure on the framework 12 is defined in advance when the framework 12 preprocesses the application 11 to execute the application 11. Accordingly, the bypassing work may be performed by changing the information so that the dummy code loaded in advance is executed instead of the call target function stored in advance.

Since the modulation work is completed by executing the dummy code through the above process, the process executed in the framework 12 previously is performed continuously.

Figure 4:
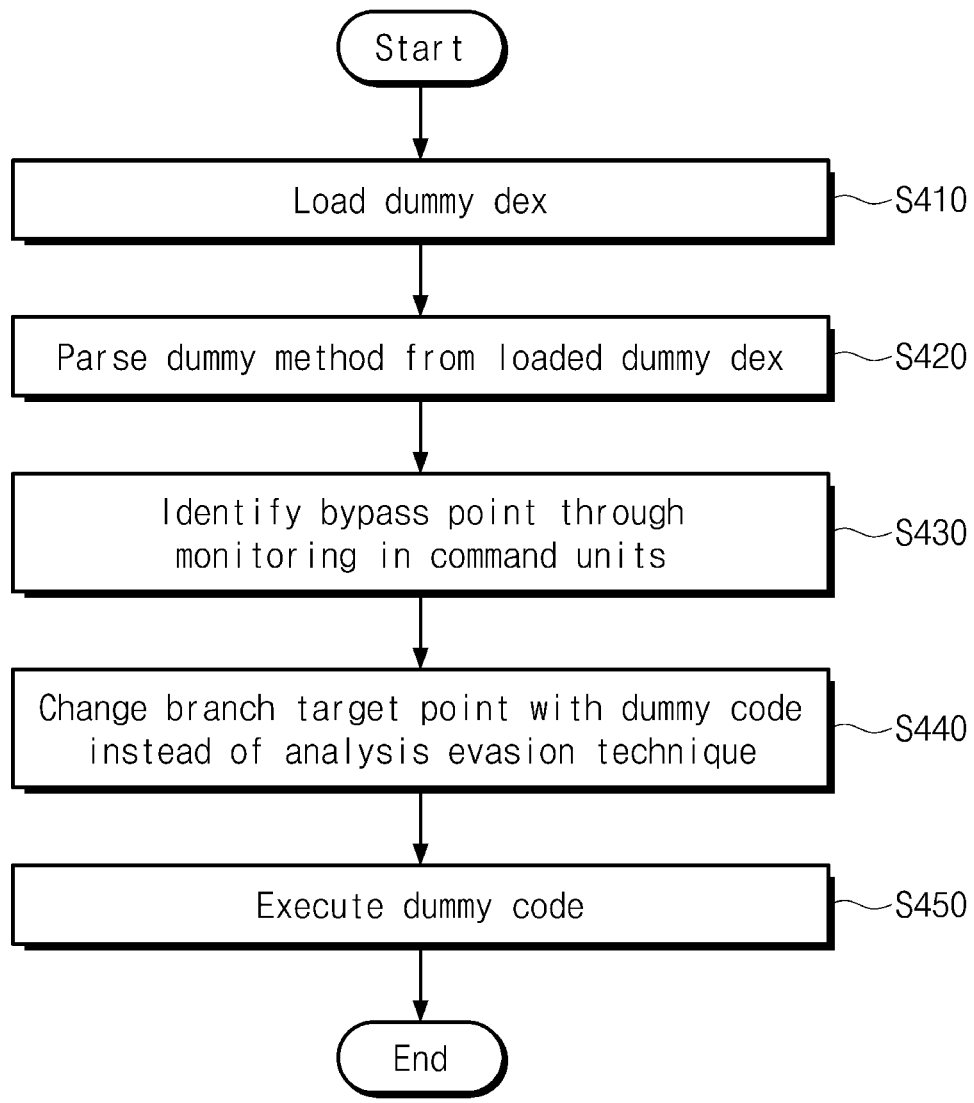
FIG. 4 is a flowchart for illustrating an analysis evasion technique bypass method according to an embodiment of the present disclosure.

Meanwhile, FIG. 4 is a flowchart for illustrating an analysis evasion technique bypass method according to an embodiment of the present disclosure.

Since the analysis evasion technique bypass method according to an embodiment of the present disclosure is performed on substantially the same configuration as the analysis evasion technique bypass device 30 shown in FIG. 2, the same components as the analysis evasion technique bypass device 30 of FIG. 2 are endowed with the same reference signs and will not be described in detail again.

The analysis evasion technique bypass method according to an embodiment of the present disclosure may include a step of loading a dummy DEX (S410), a step of parsing a dummy method containing a dummy code from the loaded dummy DEX (S420), a step of identifying a bypass point through monitoring in command units (S430), a step of changing a branch target point with the dummy code instead of the analysis evasion technique (S440), and a step of executing the dummy code (S450).

The dummy DEX loading step (S410) loads a dummy DEX file stored in the storage unit. The dummy DEX file includes dummy codes for bypassing the analysis evasion technique.

The dummy code parsing step (S420) parses class, field and method, which are the dummy codes, from the dummy DEX file to be managed in the framework in order to execute the codes of the dummy DEX code loaded from the storage unit. By doing so, all preprocessing processes that need to be performed before the application is executed are completed.

The bypass point identifying step (S430) compares a set modulation point with the database command code stored in the database and determines based on the comparison result whether a function to be currently called is a bypass target function to which the analysis evasion technique is applied.

If the set modulation point and the database command code are the same according to the comparison result, it may be determined that the modulation point needs to be modulated, and if not, it may be determined that the modulation point does not need to be modulated.

The case where the modulation point needs to be modulated corresponds to a case where it is not necessary to bypass the analysis evasion technique at the modulation point. In this case, the corresponding modulation point may be transmitted to the framework of the application, and accordingly the application may be executed according to the framework including the unmodulated modulation point.

The branch target point changing step (S440) changes information so that the dummy code loaded in advance is executed instead of the call target function stored in advance (by changing the branch target point with the dummy code instead of the analysis evasion technique), thereby enabling to perform the bypassing work.

The dummy code executing step (S450) may transmit the dummy code to the framework of the application so that the dummy code is executed. Accordingly, the corresponding method of the analysis evasion technique is not executed, which is substantially the same as the analysis evasion technique is bypassed.

The analysis evasion technique bypass method may be implemented as an application or in the form of program commands that may be executed through various computer components and may be recorded in a computer-readable recording medium. The computer-readable recording medium may include a program command, a data file, a data structure, or the like alone or in combination.

The program commands recorded in the computer-readable recording medium may be specially designed and constructed for the present disclosure and may be already known to and usable by those skilled in the computer software field.

Examples of the computer-readable recording medium include magnetic media such as hard disks, floppy disks and magnetic tapes, optical recording media such as CD-ROMs and DVDs, magnetic-optical media such as floptical disks, and hardware devices specially configured to store and execute program commands such as ROM, RAM and flash memories.

Examples of the program command include not only machine language codes produced by a compiler but also high-level language codes that may be executed by a computer using an interpreter or the like. The hardware device may be configured to operate as one or more software modules to perform the processing according to the present disclosure, or vice versa.

Although the present disclosure has been described with reference to embodiments, it would be understood that various modifications and changes can be made by those skilled in the art from the present disclosure without departing from the idea and scope defined in the appended claims.

REFERENCE SIGNS

1: system including an analysis evasion technique bypass device
10: mobile device
20: database device
30: analysis evasion technique bypass device

The invention claimed is:

1. A method for bypassing an analysis evasion technique applied to an application using an analysis evasion device for analyzing and bypassing the analysis evasion technique, the method comprising:
   loading a dummy DEX file stored in a storage unit;
   parsing a dummy method containing a dummy code from the dummy DEX file;
   identifying a bypass point, wherein the identifying the bypass point comprises comparing a set modulation point with a database command code; and based on a comparison result, determining whether a function to be currently called is a bypass target function to which the analysis evasion technique is applied;
   changing a branch target point, wherein the changing the branch target point comprises changing information according to a determination result so that the dummy code is executed instead of the bypass target function; and
   executing the dummy code, wherein the executing the dummy code comprises transmitting the dummy code to a framework of the application and executing the dummy code.

2. The method of claim 1, wherein the identifying the bypass point determines that the analysis evasion technique is applied to the application when the set modulation point is identical to the database command code stored in a database.

3. The method of claim 1, wherein the dummy method includes at least one of class, field, and method.

4. The method of claim 1, wherein the set modulation point is a point at which the analysis evasion technique is applied in the application.

5. The method of claim 1, wherein the dummy code is parsed in a preprocessing process before the application is executed.

6. The method of claim 1, wherein the analysis evasion technique is bypassed by executing the dummy code.

7. A non-transitory computer-readable recording medium in which a computer program for the method of claim 1 is recorded.

8. A device for bypassing an analysis evasion technique, the device comprising:
   a dummy DEX loader configured to load a dummy DEX file containing a dummy code in a memory before an application is executed;
   a dummy method parser configured to parse a dummy method containing the dummy code from the dummy DEX file;
   a code modulator configured to modulate a code and an environment value of a framework execution environment when a method of the analysis evasion technique is executed, so that the method is not executed and the dummy code is executed; and
   a callback unit configured to detect a signal generated when a new method is called from a framework of the application and transmit a completion signal to the framework to perform a normal operation when the bypassing is completed by executing the dummy code.

9. The device of claim 8, wherein the dummy method includes at least one of class, field, and method.

10. The device of claim 8, wherein the framework is an Android framework.

11. The device of claim 8, wherein the environment value is modulated when a set modulation point is determined as being identical to a database command code stored in a database.

12. The device of claim 11, wherein the set modulation point is a point at which the analysis evasion technique is applied in the application.

* * * * *